(12) United States Patent
Iyengar

(10) Patent No.: US 10,606,820 B2
(45) Date of Patent: Mar. 31, 2020

(54) SYNCHRONIZING DATA VALUES BY REQUESTING UPDATES

(71) Applicant: International Business Machines Corporation, Armonk, NY (US)

(72) Inventor: Arun Iyengar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 15/593,377

(22) Filed: May 12, 2017

(65) Prior Publication Data

US 2018/0329938 A1    Nov. 15, 2018

(51) Int. Cl.
| | |
|---|---|
| *G06F 17/30* | (2006.01) |
| *G06F 16/23* | (2019.01) |
| *G06F 16/27* | (2019.01) |
| *G06F 16/28* | (2019.01) |
| *G06F 16/22* | (2019.01) |

(52) U.S. Cl.
CPC ...... *G06F 16/2329* (2019.01); *G06F 16/2246* (2019.01); *G06F 16/273* (2019.01); *G06F 16/275* (2019.01); *G06F 16/289* (2019.01)

(58) Field of Classification Search
CPC .. G06F 16/2329; G06F 16/273; G06F 16/289; G06F 16/2246; G06F 16/275
See application file for complete search history.

(56) References Cited

U.S. PATENT DOCUMENTS

| | | | |
|---|---|---|---|
| 5,138,141 A | 8/1992 | Blanford et al. | |
| 7,680,834 B1 * | 3/2010 | Sim-Tang | G06F 11/2082 707/999.201 |
| 7,721,002 B2 | 5/2010 | Knight et al. | |
| 7,739,234 B1 * | 6/2010 | Figge | G06F 16/902 707/610 |
| 8,271,434 B2 * | 9/2012 | Gudlavenkatasiva | G06F 16/273 707/610 |
| 8,332,354 B1 * | 12/2012 | Chatterjee | G06F 11/1461 707/624 |
| 8,775,374 B2 | 7/2014 | Araki et al. | |
| 9,009,098 B1 * | 4/2015 | Hushon | G06F 16/27 707/602 |

(Continued)

OTHER PUBLICATIONS

Wikipedia, "AVL tree", https://en.wikipedia.orgiwiki/AVL_tree, last visited on May 11, 2017, pp. 1-11.

(Continued)

*Primary Examiner* — Jared M Bibbee
(74) *Attorney, Agent, or Firm* — Fleit Intellectual Property Law; Jose Gutman

(57) ABSTRACT

A processing system, computer program product, and methods for maintaining consistent values of objects in two or more stores. A method includes a data store associating an update time for each object of a plurality of objects, where each object of the plurality of objects resides on a respective another data store. The data store maintains a data structure ordering the plurality of objects by update times. The data store periodically examines the data structure to read update times. The data store makes a decision to request an updated version of an object belonging to the plurality of objects based on an update time of the object. The data structure can be a balanced tree.

15 Claims, 7 Drawing Sheets

(56) References Cited

U.S. PATENT DOCUMENTS

| | | | |
|---|---|---|---|
| 9,009,116 B2* | 4/2015 | Cattell | G06F 16/217 |
| | | | 707/656 |
| 10,019,501 B2* | 7/2018 | Zondervan | G06F 16/275 |
| 2004/0260715 A1* | 12/2004 | Mongeon | G06F 16/80 |
| 2005/0063374 A1* | 3/2005 | Rowan | G06F 11/1469 |
| | | | 370/382 |
| 2005/0076264 A1* | 4/2005 | Rowan | G06F 11/1469 |
| | | | 714/6.12 |
| 2006/0047902 A1* | 3/2006 | Passerini | G06F 3/0611 |
| | | | 711/114 |
| 2006/0047999 A1* | 3/2006 | Passerini | G06F 11/1458 |
| | | | 714/6.12 |
| 2013/0097117 A1* | 4/2013 | Lasky | G06F 11/1451 |
| | | | 707/624 |
| 2014/0359170 A1* | 12/2014 | Hutchings | G06F 13/10 |
| | | | 710/8 |
| 2014/0379638 A1* | 12/2014 | Li | G06F 16/27 |
| | | | 707/610 |
| 2015/0142489 A1* | 5/2015 | Block | H04W 4/029 |
| | | | 705/7.13 |
| 2017/0235808 A1* | 8/2017 | Salame | H04L 67/1095 |
| | | | 707/625 |

OTHER PUBLICATIONS

Wikipedia, "Red-black tree", https://en.wikipedia_org/wiki/Red%E2T080%93black_tree, last visited on May 11, 2017, pp. 1-18.
Wikipedia, "B-tree", https://en.wikipedia.org/wiki/B-tree, last visited on May 11, 2017, pp. 1-13.

* cited by examiner

SYNCHRONIZING DATA VALUES BY REQUESTING UPDATES

BACKGROUND

The present invention generally relates to data stores, data caching, and file storage systems, in computer systems. Many data stores exist such as SQL data stores, NoSQL data stores, caches, and file systems. If multiple data stores are being used, a key problem is how to synchronize data values so that the same values are maintained in the data stores. A method is needed to synchronize data values maintained in multiple data stores.

BRIEF SUMMARY

According to various embodiments, disclosed is a method for maintaining consistent values of objects, the method comprising: a data store d1 associating an update time for each object of a plurality of objects wherein each object of the plurality of objects resides on a data store other than the data store d1; the data store d1 maintaining a data structure ordering the plurality of objects by update times; the data store d1 periodically examining the data structure to read update times; and the data store d1 making a decision to request an updated version of an object belonging to the plurality of objects based on an update time of the object.

According to various embodiments, disclosed is a processing system comprising: a server; memory; a network interface device for communicating with one or more networks; and at least one processor, communicatively coupled with the server, the memory, and the network interface device, the at least one processor, responsive to executing computer instructions, for performing operations comprising: a data store d1 associating an update time for each object of a plurality of objects wherein each object of the plurality of objects resides on a data store other than the data store d1; the data store d1 maintaining a data structure ordering the plurality of objects by update times; the data store d1 periodically examining the data structure to read update times; and the data store d1 making a decision to request an updated version of an object belonging to the plurality of objects based on an update time of the object.

According to various embodiments, disclosed is a computer program product for a processing system, the computer program product comprising a computer readable storage medium having computer readable program code embodied therewith, the computer readable program code including computer instructions, where a processor, responsive to executing the computer instructions, performs operations comprising: a data store d1 associating an update time for each object of a plurality of objects wherein each object of the plurality of objects resides on a data store other than the data store d1; the data store d1 maintaining a data structure ordering the plurality of objects by update times; the data store d1 periodically examining the data structure to read update times; and the data store d1 making a decision to request an updated version of an object belonging to the plurality of objects based on an update time of the object.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

Various embodiments of the present invention are applicable to synchronizing data values between two or more data stores in a wide variety of environments, which may include cloud computing environments and non-cloud environments. According to various embodiments of the invention, provided is the capability to synchronize values between two or more data stores. The term data store is intended to broadly includes a wide variety of systems for storing data, such as but not limited to, MySQL, DB2, Cassandra, Cloudant, file systems, memcached, redis, and many other systems. Furthermore, throughout this patent application, a data store can include both the software used for storing data as well as one or more computers on which the software runs.

Figure 3:
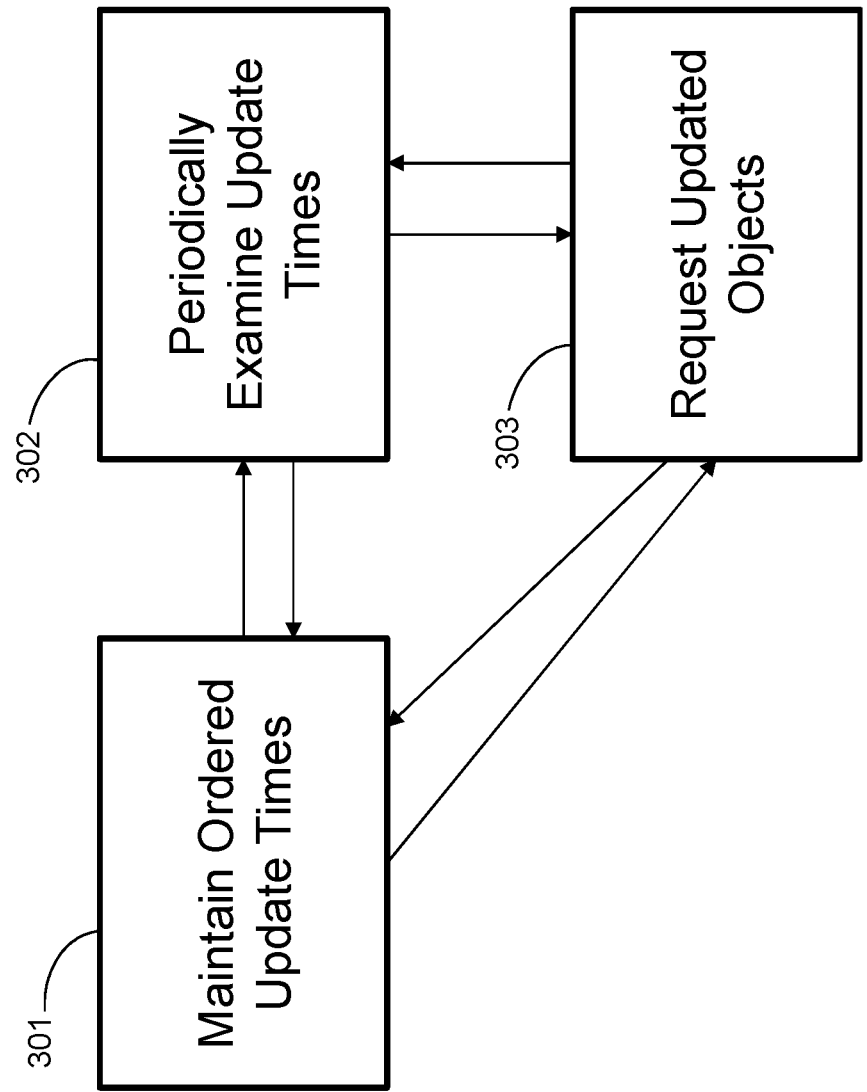
FIG. 3 is a block diagram illustrating an example of a method for synchronizing data values, according to an embodiment of the present invention.

FIG. 3 shows a method for synchronizing data values in accordance with the current invention. The method can be used by the system in FIG. 1. Data store 1 101 is caching copies of objects which reside in other data stores. For example, object o1 might reside in data store 2 103. Since data store 1 101 is using object o1, it caches object o1 so that it does not have to fetch object o1 from data store 2 103 each time data store 1 101 needs to access object o1. A key problem is that object o1 may be changing. The current value of object o1 can be found by contacting data store 2 103. There is overhead for data store 1 101 to contact data store 2 103. Data store 1 101 thus employs techniques to selectively contact data store 2 103 to obtain current values of object o1.

Figure 1:
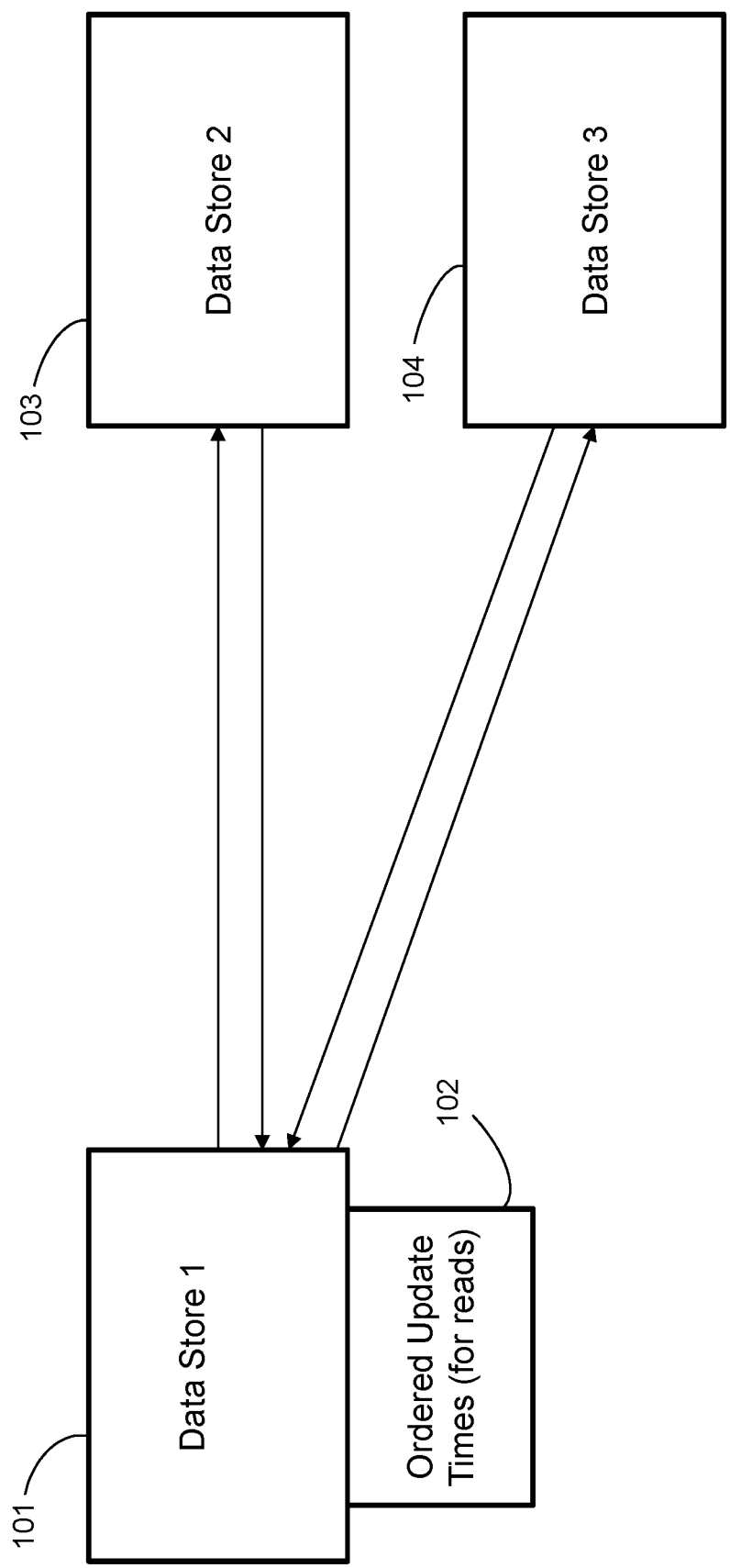
FIG. 1 is a block diagram illustrating an example of a plurality of data stores, according to an embodiment of the present invention.

Note that while FIG. 1 depicts three data stores, the number of data stores can be two, three, four, five, or a larger positive integer.

Data store 1 101 maintains update times for objects such as object o1 which reside on remote data stores. An update time for an object is an indication of when data store 1 101 should contact a remote server to obtain an updated value of object o1. Update times may be based on one or more of several criteria. For example, an update time might be an expiration time for an object provided by the data store on which the object resides.

Update times might be based on how frequently (i.e., a frequency with which) an object changes. If an object changes frequently, its update time should be sooner than if the object changes less frequently. The data store on which the object resides is often in the best position to provide information on how frequently the object changes.

Update times can also be based on how important it is for a data store to have the most recent version of an object. For example, if it is very important for data store 1 101 to have an updated copy of object o1, then the update time for object o1 would be sooner than if it is not important for data store 1 101 to have an updated copy of object o1.

Update times can also be based on the cost of obtaining an updated object from a remote data store. This cost can be a monetary cost. It can also be a bandwidth cost. Large objects consume more bandwidth to fetch than smaller objects, and are thus more costly to fetch. The cost can also be based on computational resources for obtaining current objects. For example, it may be computationally expensive for data store 2 103 to calculate a current value of object o1.

If the cost of obtaining an updated object from a remote data store is low, then the update time for the object would be sooner than if the cost of obtaining an updated object from a remote data store is high.

Update times can also be based on how frequently (i.e., a frequency with which) a data store uses an object. For example, if data store 1 101 uses object o1 frequently, then the update time for object o1 would be sooner than if data store 1 101 uses object o1 rarely.

Data store 1 101 maintains a data structure ordering update times of objects from remote data stores that it has cached. This data structure is depicted as Ordered Update Times data structure 102 in FIG. 1. This step is depicted as 301 in FIG. 3.

In order to order update times of cached objects, an efficient data structure should be used. Ordered Update Times data structure 102 can be implemented using a balanced tree, such as an AVL tree, a red-black tree, or a B-tree (see the relevant articles found online on the Wikipedia website).

Ordered Update Times data structure 102 can also be implemented using a list. However, a list will usually not be as efficient as a balanced tree.

In step 302, data store 1 101 periodically examines the Ordered Update Times data structure 102 to determine which objects, if any, should be updated. Data store 1 101 makes a decision to update an object based on its update time. If the update time is soon or has elapsed, according to the example, data store 1 101 contacts, in step 303, the remote server on which the object resides to determine if an updated version of the object is needed.

One method of determining whether data store 1 101 should contact data store 2 103 to obtain an updated version of object o1 is by comparing the current time to the update time (i.e., the update time which is maintained in the Ordered Update Times data structure 102) for object o1. If the difference between the update time for object o1 and the current time is below a threshold value, data store 1 101 contacts data store 2 103 to see if object o1 has changed. Otherwise, data store 1 101 does not contact data store 2 103.

Data store 1 101 can directly request an updated copy of object o1 from data store 2 103. An alternative is to use entity tags. Object o1 has an entity tag indicating its version. Data store 1 101 contacts data store 2 103 for an updated version of object o1 and sends data store 2 103 its entity tag for object o1. If the entity tag sent by data store 1 101 is current, data store 2 103 informs data store 1 101 that the cached value of object o1 it has is still current. Data store 2 103 does not need to send an updated value of object o1 to data store 1 101, which can save considerable network bandwidth.

If the entity tag sent by data store 1 101 is not current, according to the example, then data store 3 103 sends a current copy of object o1 to data store 1 101.

If object o1 has been deleted, then this information is provided to data store 1 101. Data store 1 101 might then delete its copy of object o1. Once an object cached in data store 1 101 is deleted, the update time and other data associated with the object are also deleted from Ordered Update Times data structure 102.

Data store 2 103 might also send an updated expiration time for object o1 to data store 1 101. Data store 1 101 can use this expiration time to determine an update time for object o1. Data store 1 101 can store and maintain this expiration time information associated with object o1, along with other information associated with object o1, in the Ordered Update Times data structure 102.

When multiple objects need to be updated from the same server, it is often more efficient to perform multiple updates in a single request than to perform each update in a separate request. An optimization thus supported by various embodiments of the present invention, is the ability to batch multiple updates in response to a single request. Suppose data store 1 101 is caching multiple objects from data store 2 103. Suppose that data store 1 101 has determined that x (e.g. x can be 7 or another integer >1) of the cached objects have update times which occur in close proximity to each other. By close proximity, this can mean that the difference between the latest update time lt and the earliest update time et (corresponding to object oet) for all x objects is less than a threshold value. Other definitions of close proximity are possible within the scope of the invention.

When data store 1 101 determines that it is time to query data store 2 103 to determine if object oet has changed, data store 1 101 actually queries data store 2 103 to get updates for all x objects in a single request. Data store 2 103 then sends update information for all x objects in a single response.

Figure 2:
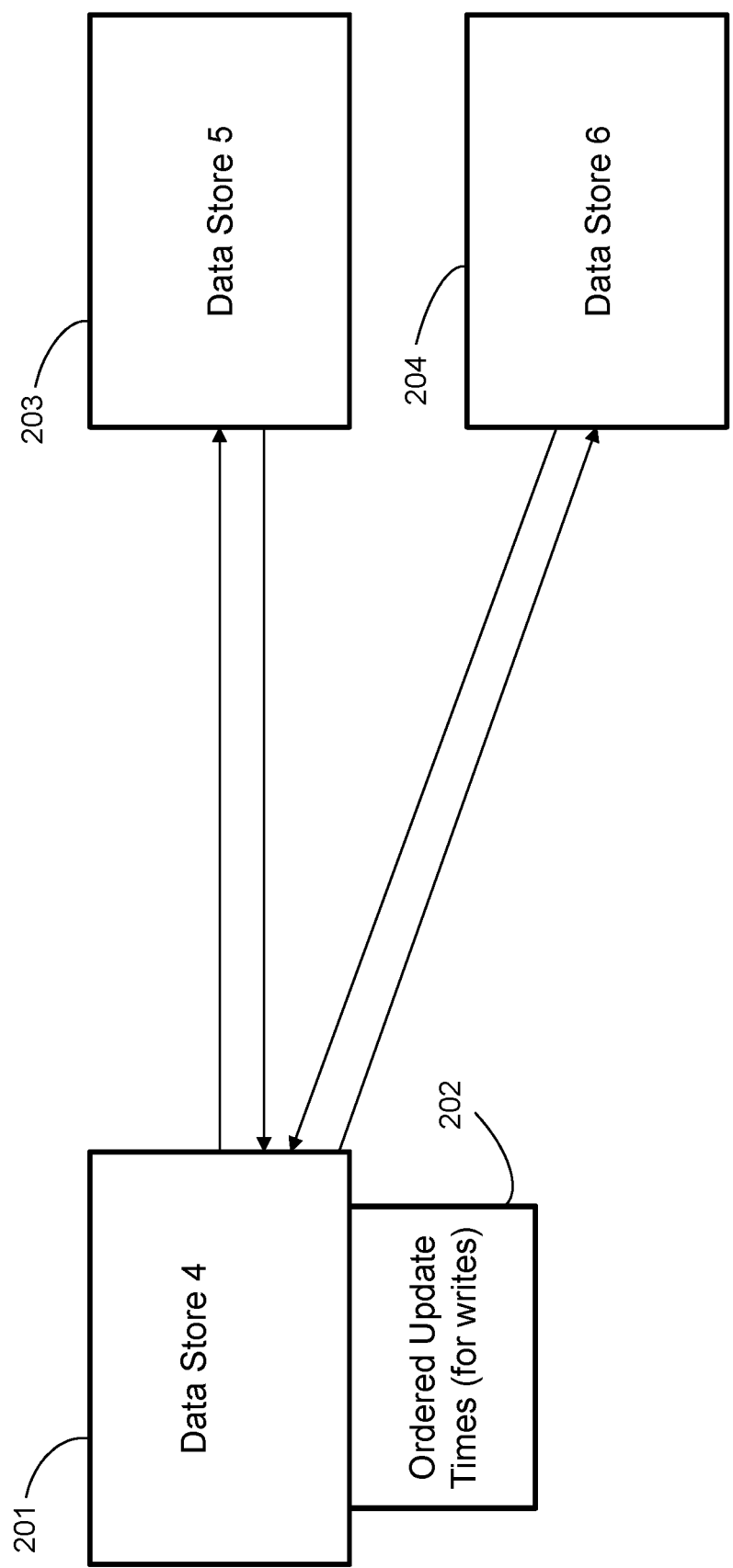
FIG. 2 is a block diagram illustrating an example of another plurality of data stores, according to an embodiment of the present invention.
Figure 4:
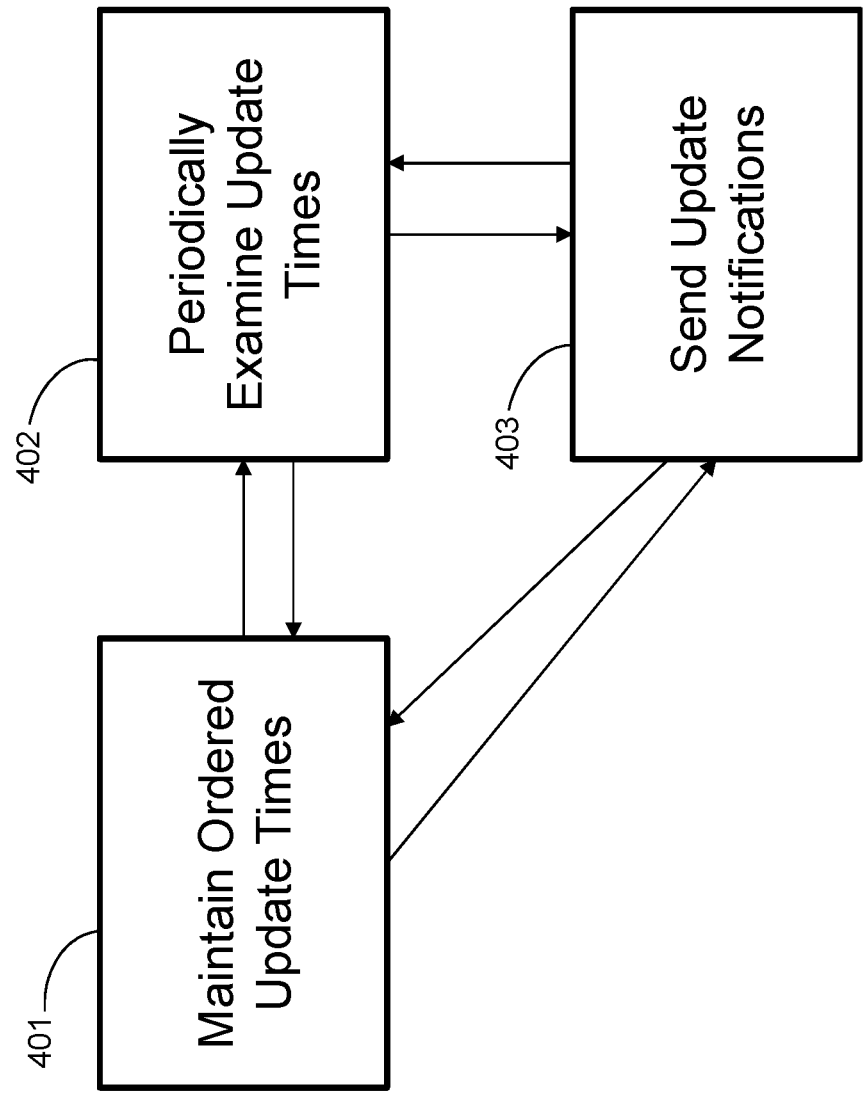
FIG. 4 is a block diagram illustrating an example of another method for synchronizing data values, according to an embodiment of the present invention.

FIG. 4 shows another method for synchronizing data values in accordance with the current invention. The method can be used by the system in FIG. 2. Several objects reside in Ordered Update Times data store 4 201. Data store 5 203 and data store 6 204 can cache data objects residing on data store 4 201. Data store 4 201 has the ability to contact data store 5 203 and data store 6 204 to indicate that one or more objects have changed. Note that while FIG. 2 depicts three data stores, the number of data stores can be two, three, four, five, or a larger positive integer.

Suppose object o1 resides in data store 4 201. Data store 5 203 is using object o1 and caches object o1 so that it does not have to fetch object o1 from data store 4 201 each time data store 5 203 needs to access object o1. A key problem is that object o1 may be changing. Data store 4 201 can send the current value of object o1 to data store 5 203. There is overhead for data store 4 201 to do this. Data store 4 201 thus employs techniques to selectively contact data store 5 203 to send current values of object o1.

Data store 4 201 maintains update times for objects such as object o1 which reside on data store 4 201 but might be cached in remote data stores. An update time for an object is an indication of when data store 4 201 should contact a remote server to notify the remote server of changes to object o1. Update times may be based on one or more of several criteria. For example, an update time might be an expiration time for an object provided by the data store on which the object resides.

Update times might be based on how frequently an object changes. If an object changes frequently, its update time should be sooner than if the object changes less frequently. The data store on which the object resides is often in the best position to provide information on how frequently the object changes.

Update times can also be based on how important it is for a data store to have the most recent version of an object. For example, if it is very important for a data store to have an updated copy of object o1, then the update time for object o1 would be sooner than if it is not important for a data store to have an updated copy of object o1.

Update times can also be based on the cost of sending an updated object to a remote data store. This cost can be a monetary cost. It can also be a bandwidth cost. Large objects consume more bandwidth to send than smaller objects, and are thus more costly to send. The cost can also be based on computational resources for determining current objects. For example, it may be computationally expensive for data store 4 201 to calculate a current value of object o1.

If the cost of obtaining an updated object from a remote data store is low, then the update time for the object would be sooner than if the cost of obtaining an updated object from a remote data store is high.

Update times can also be based on how frequently (i.e., a frequency with which) a data store uses an object. For example, if s data store uses object o1 frequently, then the update time for object o1 would be sooner than if the data store uses object o1 rarely.

Data store 4 201 maintains a data structure ordering update times of objects from remote data stores that it has cached. This data structure is depicted as Ordered Update Times data structure 202 in FIG. 2. This step is depicted as 401 in FIG. 4.

In order to order update times of cached objects, an efficient data structure should be used. Ordered Update Times data structure 202 can be implemented using a balanced tree, such as an AVL tree, a red-black tree, or a B-tree (see the relevant articles found online on the Wikipedia website).

Ordered Update Times data structure 202 can also be implemented using a list. However, a list will usually not be as efficient as a balanced tree.

In step 402, data store 4 201 periodically examines Ordered Update Times data structure 202 to determine which object updates, if any, should be sent to remote data stores. Data store 4 201 makes a decision to send information about an object based on its update time. If the update time is soon or has elapsed, data store 4 201 contacts, in step 403, a remote server which may be caching the object regarding updates to the object.

One example method of determining whether data store 4 201 should contact data store 5 203 to send information regarding object o1 is by comparing the current time to the update time (i.e., the update time which is maintained in the Ordered Update Times data structure 202) for object o1. If the difference between the update time for object o1 and the current time is below a threshold value, data store 4 201 contacts data store 5 203 regarding object o1. Otherwise, data store 4 201 does not contact data store 5 203.

In step 403, according to the example, sometimes data store 4 201 will know the exact version of object o1 that data store 5 203 is storing. If data store 5 203 is already storing the current version of object o1, data store 4 201 does not need to send the current version of object of to data store 5 203. If data store 5 203 is not storing the current version of object o1, data store 4 201 can either send the new version of object o1 to data store 5 203 or simply notify data store 5 203 that object o1 has changed.

If data store 4 201 does not know the exact version of object o1 that data store 5 203 is storing, data store 4 201 can try to find this out by requesting an entity tag corresponding to object o1 stored by data store 5 203, entity tag et_o1. If data store 5 203 actually has and returns entity tag et_o1, data store 4 201 compares entity tag et_o1 to the current entity tag for object o1. If they match, then data store 4 201 does not need to send an updated version of object o1 to data store 5 203. If they do not match (or data store 5 203 was not able to return an entity tag to object o1), then data store 4 201 indicates to data store 5 203 that the value of object o1 has changed and/or sends a new version of object o1 to data store 5 203.

If object o1 has been deleted, then this information is provided to data store 5 203. Data store 5 203 might then delete its copy of object o1. Once an object in data store 4 201 is deleted, the update time and other data associated with the object are also deleted from Ordered Update Times data structure 202.

When multiple objects need to be updated on the same server, it is often more efficient to perform multiple updates in a single request than to perform each update in a separate request. An optimization thus supported by various embodiments of the present invention, is the ability to batch multiple updates in response to a single request. Suppose data store 5 203 is caching multiple objects from data store 4 201. Suppose that data store 4 201 has determined that x (e.g., x can be a value of seven (7) or another integer >1) of the cached objects have update times which occur in close proximity (e.g., close temporal proximity) to each other. By close proximity, according to the present example, this can mean that the difference between the latest update time lt and the earliest update time et (corresponding to object oet) for all x objects is less than a threshold value. Other definitions of close proximity are possible within the scope of the present invention.

When data store 4 201 determines that it is time to send information regarding object oet (which may include the fact that object oet has changed and/or an updated value of object oet) to data store 5 203, data store 4 201 actually sends information regarding all x objects (which may identify objects which have changed, and may also include copies of one or more objects which have changed) to data store 5 203 in a single request.

Example of a Processing System Server Node Operating in a Network

Figure 5:
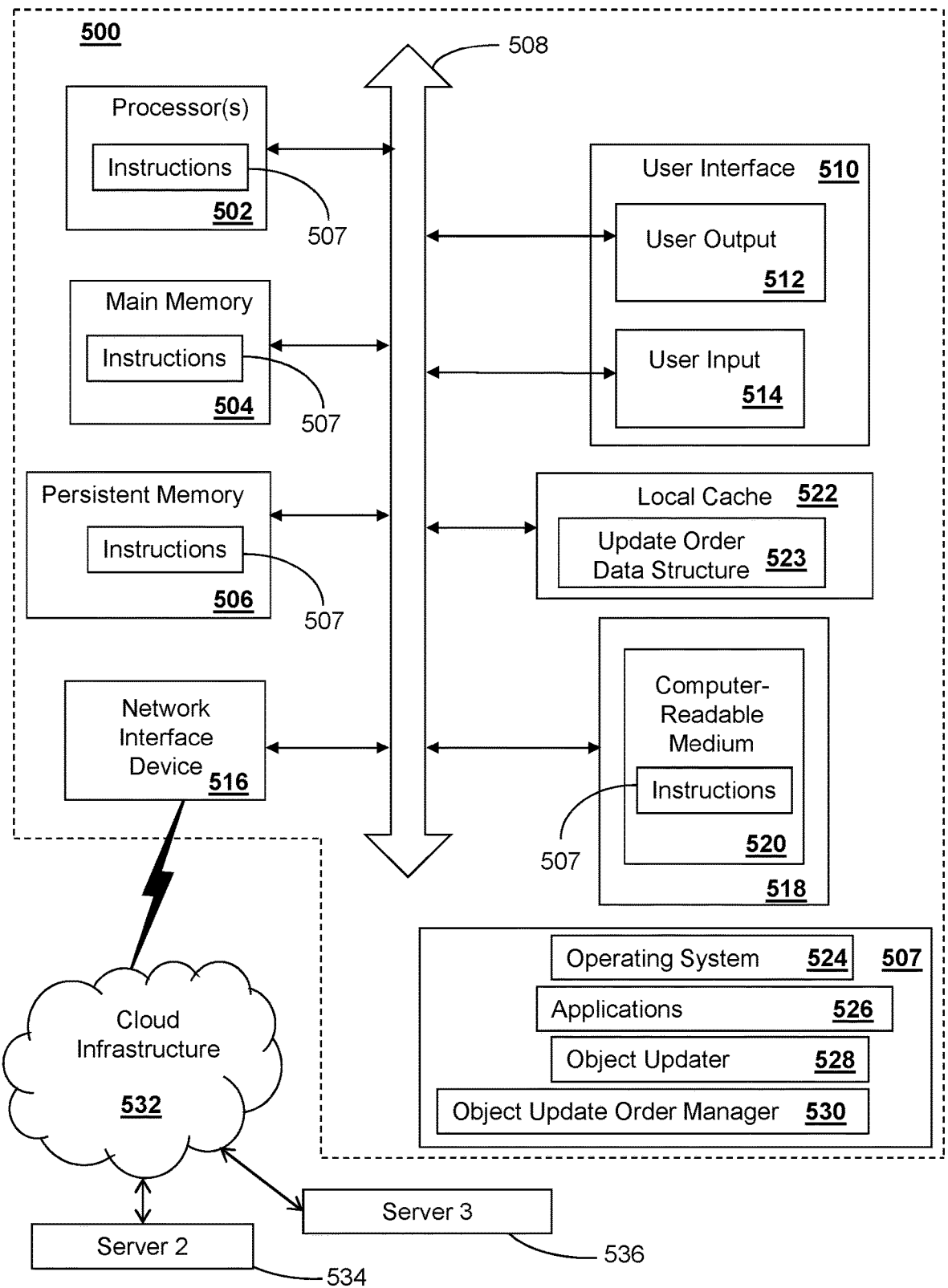
FIG. 5 is a block diagram illustrating an example processing system, according to an embodiment of the present invention

FIG. 5 illustrates an example of a processing system server node 500 (also referred to as a computer system/server or referred to as a server node) suitable for use according to various embodiments of the present invention. The server node 500, according to the example, is communicatively coupled with a cloud infrastructure 532 that can include one or more communication networks. The cloud infrastructure 532 is communicatively coupled with a storage cloud 534 (which can include one or more storage servers) and with a computation cloud 536 (which can include one or more computation servers). This simplified example is not intended to suggest any limitation as to the scope of use or function of various example embodiments of the invention described herein.

The server node 500 comprises a computer system/server, which is operational with numerous other general purpose or special purpose computing system environments or configurations. Examples of well-known computing systems, environments, and/or configurations that may be suitable for use with such a computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems and/or devices, and the like.

The computer system/server 500 may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Referring more particularly to FIG. 5, the following discussion will describe a more detailed view of an example cloud infrastructure server node embodying at least a portion of the client-server system of FIG. 1. According to the example, at least one processor 502 is communicatively coupled with system main memory 504 and persistent memory 506.

A bus architecture 508 facilitates communicatively coupling between the at least one processor 502 and the various component elements of the server node 500. The bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system main memory 504, in one embodiment, can include computer system readable media in the form of volatile memory, such as random access memory (RAM) and/or cache memory. By way of example only, a persistent memory storage system 506 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, persistent memory 506 may include at least one program product having a set (e.g., at least one) of program modules that are configured to carry out the functions of various embodiments of the invention.

Program/utility, having a set (at least one) of program modules, may be stored in persistent memory 506 by way of example, and not limitation, as well as an operating system 524, one or more application programs 526, other program modules, and program data. Each of the operating system 524, one or more application programs 526, other program modules, and program data, or some combination thereof, may include an implementation of a networking environment. Program modules generally may carry out the functions and/or methodologies of various embodiments of the invention as described herein.

The at least one processor 502 is communicatively coupled with one or more network interface devices 516 via the bus architecture 508. The network interface device 516 is communicatively coupled, according to various embodiments, with one or more networks operably coupled with a cloud infrastructure 532. The cloud infrastructure 532, according to the example, includes a second server 534, which may also be referred to as a second server node on the network, and a third server 536, which may also be referred to as a third server node on the network. The network interface device 516 can communicate with one or more networks such as a local area network (LAN), a general wide area network (WAN), and/or a public network (e.g., the Internet). The network interface device 516 facilitates communication between the server node 500 and other server nodes in the cloud infrastructure 532.

A user interface 510 is communicatively coupled with the at least one processor 502, such as via the bus architecture 508. The user interface 510, according to the present example, includes a user output interface 512 and a user input interface 514. Examples of elements of the user output interface 512 can include a display, a speaker, one or more indicator lights, one or more transducers that generate audible indicators, and a haptic signal generator. Examples of elements of the user input interface 514 can include a keyboard, a keypad, a mouse, a track pad, a touch pad, and a microphone that receives audio signals. The received audio signals, for example, can be converted to electronic digital representation and stored in memory, and optionally can be used with voice recognition software executed by the processor 502 to receive user input data and commands.

A computer readable medium reader/writer device 518 is communicatively coupled with the at least one processor 502. The reader/writer device 518 is communicatively coupled with a computer readable medium 520. The server node 500, according to various embodiments, can typically include a variety of computer readable media 520. Such media may be any available media that is accessible by the processing system/server 500, and it can include any one or more of volatile media, non-volatile media, removable media, and non-removable media.

Computer instructions 507 can be at least partially stored in various locations in the server node 500. For example, at least some of the instructions 507 may be stored in any one or more of the following: in an internal cache memory in the one or more processors 502, in the main memory 504, in the persistent memory 506, and in the computer readable medium 520.

The instructions 507, according to the example, can include computer instructions, data, configuration parameters, and other information that can be used by the at least one processor 502 to perform features and functions of the server node 500. According to the present example, the instructions 507 include an operating system 524 and one or more applications 526. The instructions 507 also include an object updater 528 which updates objects in the local cache 522 according to the methods that have been discussed above with reference to FIGS. 1-4. Additionally, the instructions 507 include an Object Update Order Manager 530 which, according to the data stored in the Update Order Data Structure 523 in the local cache 522, manages when to update objects in the local cache 522, e.g., the timing and the order of updating objects in the local cache 522, according to the methods that have been discussed above with reference to FIGS. 1-4. Additionally, the instructions 507 include server node configuration data (not shown).

The at least one processor 502, according to the example, is communicatively coupled with the server cache storage 522 (also referred to as local cache), which can store at least a portion of the server node data, the Update Order Data Structure 523, networking system and cloud infrastructure messages and data being communicated with the server node 500, and other data, for operation of services and applications coupled with the server node 500. Various functions and features of the present invention, as have been discussed above, may be provided with use of the server node 500.

Example Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
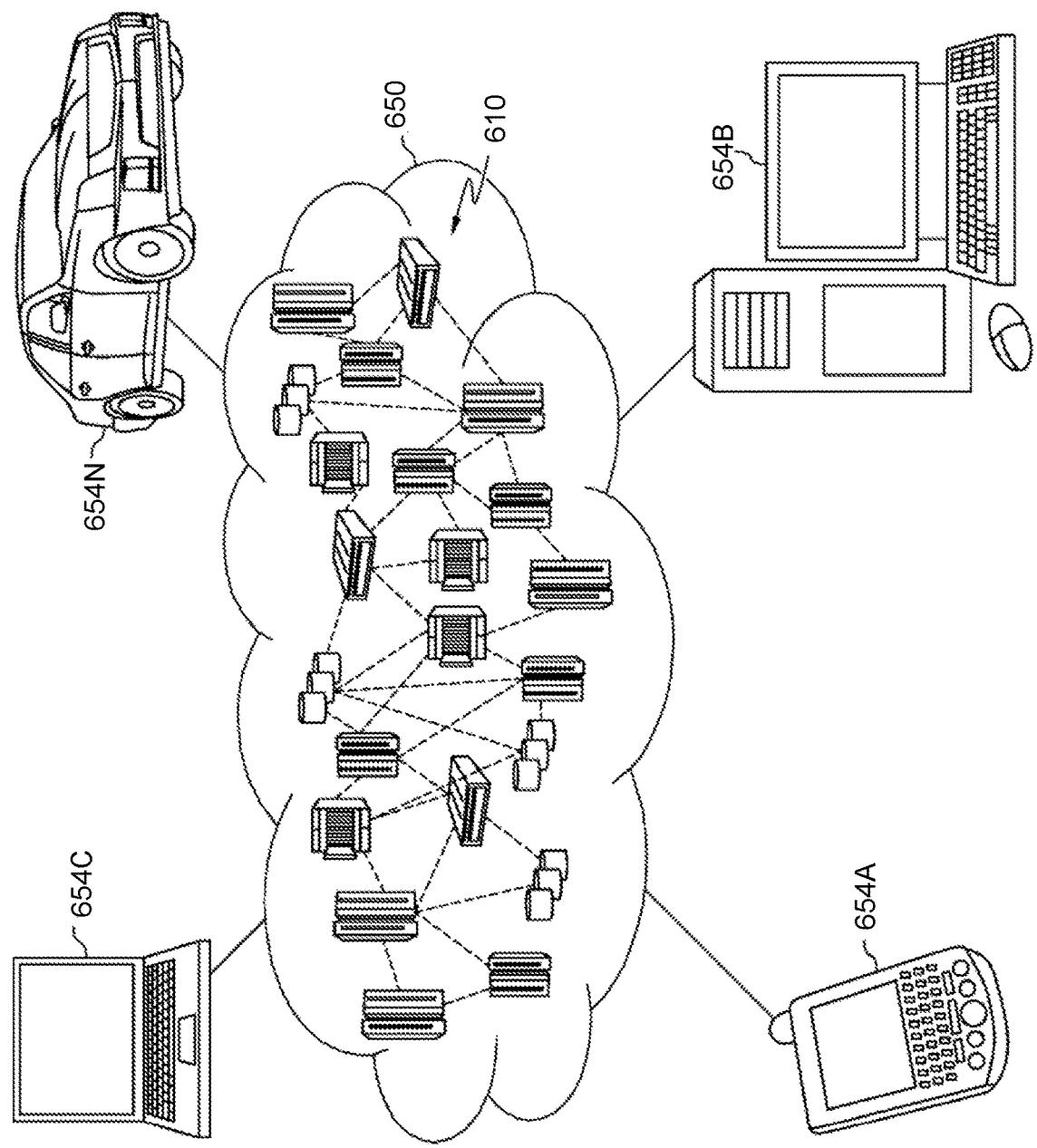
FIG. 6 depicts a cloud computing environment suitable for use in an embodiment of the present invention.

Referring now to FIG. 6, an illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
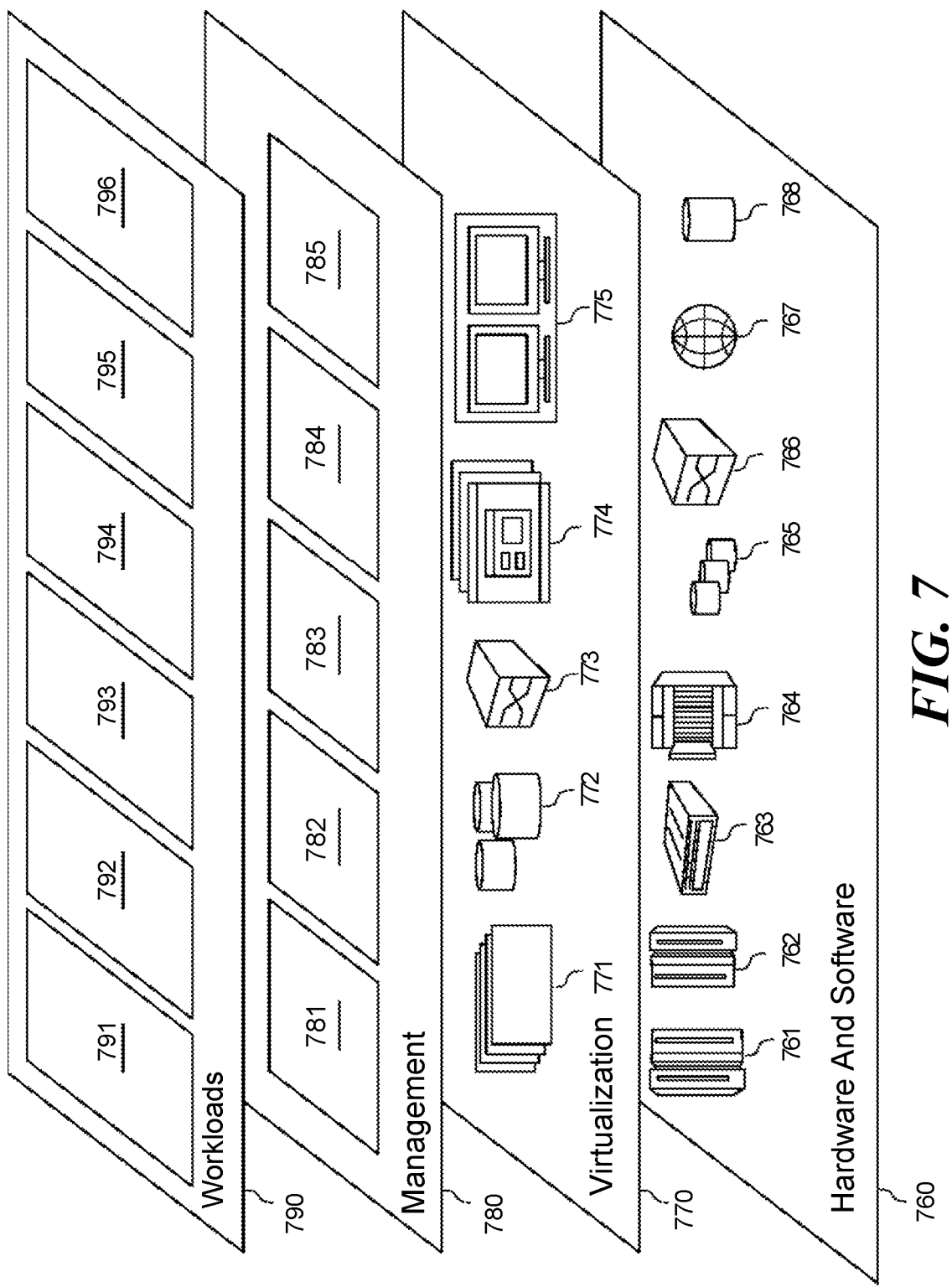
FIG. 7 depicts abstraction model layers according to the cloud computing embodiment of FIG. 6.

Referring now to FIG. 7, a set of functional abstraction layers provided by cloud computing environment 650 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking of resources which are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and other data communication and delivery services 796. Various functions and features of the present invention, as have been discussed above, may be provided with use of a server node 500 communicatively coupled with a cloud infrastructure 532.

Non-Limiting Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present specification may describe components and functions implemented in the embodiments with reference to particular standards and protocols, the invention is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this invention. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments of the present invention can further incorporate interfaces that each includes separate, fully programmed microprocessors that are used to off-load processing from the processor. An operating system included in main memory for a processing system may be a suitable multitasking and/or multiprocessing operating system, such as, but not limited to, any of the Linux, UNIX, Windows, and Windows Server based operating systems. Various embodiments of the present invention are able to use any other suitable operating system. Various embodiments of the present invention utilize architectures, such as an object oriented framework mechanism, that allow instructions of the components of the operating system to be executed on any processor located within an information processing system. Various embodiments of the present invention are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "include", includes", "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed.

The description of the present application has been presented for purposes of illustration and description, but is not intended to be exhaustive or limited to the invention in the form disclosed. Many modifications and variations will be apparent to those of ordinary skill in the art without departing from the scope of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a system including at least two data stores, a method for maintaining consistent values of objects, the method comprising:
    a data store d1 associating an update time for each object of a plurality of objects wherein each object of the plurality of objects resides, and has an entity tag stored, on a data store other than the data store d1, the entity tag indicating a version of said each object;
    the data store d1 maintaining a data structure comprising a balanced tree, the data structure ordering the plurality of objects by update times;
    the data store d1 periodically examining the data structure to read update times; and
    the data store d1 making a decision to request an updated version of an object belonging to the plurality of objects based on a difference between the update time associated with the object and a current time being less than a threshold value;
    the data store d1 sending a first entity tag identifying a version of the object to the data store on which the object resides;
    in response to the first entity tag matching an entity tag corresponding to a version of the object on the data store which the object resides, the data store on which the object resides responding to the data store d1 that the object has not changed; and
    in response to the entity tag not matching an entity tag corresponding to a version of the object on the data store which the object resides, the data store on which the object resides sending a value of the object to the data store d1.

2. The method of claim 1 in which the data store d1 requests an updated version of the object in response to a difference between the update time and a current time being less than a threshold.

3. The method of claim 1, wherein the data structure is one of a red-black tree, an AVL tree, and a B-tree.

4. The method of claim 1 in which the data structure is a list.

5. The method of claim 1 further comprising:
    the data store requesting an updated version of the object by contacting the data store on which the object resides.

6. The method of claim 1 in which an update time for the object is based on an expiration time associated with the object.

7. The method of claim 1 in which an update time for the object is based on a frequency with which the object changes.

8. The method of claim 1 in which an update time for the object is based on an importance of maintaining a current value of the object in a data store.

9. The method of claim 1 in which an update time for the object is based on a cost of the data store d1 obtaining an updated version of the object.

10. The method of claim 1 in which an update time for the object is based on a frequency with which the data store d1 uses the object.

11. The method of claim 1 further comprising:
    determining a subset including at least two of the plurality of objects which have update times in close temporal proximity and reside on a same data store; and
    requesting updated versions of all objects in the subset in a single request.

12. A computer program product for a processing system comprised of a server, the computer program product comprising a computer readable storage medium having computer readable program code embodied therewith, the computer readable program code including computer instructions, where a processor, responsive to executing the computer instructions, performs operations comprising:
- a data store d1 associating an update time for each object of a plurality of objects wherein each object of the plurality of objects resides, and has an entity tag stored, on a data store other than the data store d1, the entity tag indicating a version of said each object;
- the data store d1 maintaining a data structure comprising a balanced tree, the data structure ordering the plurality of objects by update times;
- the data store d1 periodically examining the data structure to read update times;
- the data store d1 making a decision to request an updated version of an object belonging to the plurality of objects based on a difference between the update time associated with the object and a current time being less than a threshold value;
- the data store d1 sending a first entity tag identifying a version of the object to the data store on which the object resides;
- in response to the first entity tag matching an entity tag corresponding to a version of the object on the data store which the object resides, the data store on which the object resides responding to the data store d1 that the object has not changed; and
- in response to the entity tag not matching an entity tag corresponding to a version of the object on the data store which the object resides, the data store on which the object resides sending a value of the object to the data store d1.

13. The computer program product of claim 12 in which the operations further comprise:
- the data store d1 requests an updated version of the object in response to a difference between the update time and a current time being less than a threshold.

14. A processing system comprising:
- a server;
- memory;
- a network interface device for communicating with one or more networks; and
- at least one processor, communicatively coupled with the server, the memory, and the network interface device, the at least one processor, responsive to executing computer instructions, for performing operations comprising:
- a data store d1 associating an update time for each object of a plurality of objects wherein each object of the plurality of objects resides, and has an entity tag stored, on a data store other than the data store d1, the entity tag indicating a version of said each object;
- the data store d1 maintaining a data structure comprising a balanced tree, the data structure ordering the plurality of objects by update times;
- the data store d1 periodically examining the data structure to read update times;
- the data store d1 making a decision to request an updated version of an object belonging to the plurality of objects based on a difference between the update time associated with the object and a current time being less than a threshold value;
- the data store d1 sending a first entity tag identifying a version of the object to the data store on which the object resides;
- in response to the first entity tag matching an entity tag corresponding to a version of the object on the data store which the object resides, the data store on which the object resides responding to the data store d1 that the object has not changed; and
- in response to the entity tag not matching an entity tag corresponding to a version of the object on the data store which the object resides, the data store on which the object resides sending a value of the object to the data store d1.

15. The processing system of claim 14, in which the operations further comprise:
- the data store d1 requests an updated version of the object in response to a difference between the update time and a current time being less than a threshold.

* * * * *